United States Patent
Barrenscheen et al.

(10) Patent No.: US 7,340,539 B2
(45) Date of Patent: Mar. 4, 2008

(54) DEVICE CONNECTED TO A BUS FOR STORING INFORMATION UTILIZED TO ALLOCATE PRIORITY TO DATA STORED IN STORAGE DEVICE AND METHOD FOR OPERATING THE DEVICE

(75) Inventors: Jens Barrenscheen, München (DE); Karl Herz, München (DE); Achim Vowe, München (DE)

(73) Assignee: Infineon Technologies AG, Munich (DE)

( * ) Notice: Subject to any disclaimer, the term of this patent is extended or adjusted under 35 U.S.C. 154(b) by 460 days.

(21) Appl. No.: 10/424,177

(22) Filed: Apr. 25, 2003

(65) Prior Publication Data
US 2004/0003143 A1  Jan. 1, 2004

(30) Foreign Application Priority Data
Apr. 25, 2002  (DE) .................. 102 18 646

(51) Int. Cl.
G06F 3/00 (2006.01)
G06F 13/00 (2006.01)
G06F 13/04 (2006.01)

(52) U.S. Cl. .................. 710/6; 710/16; 710/36; 710/40; 710/46; 711/147; 711/154

(58) Field of Classification Search .......... 710/5, 710/6, 36, 40–45, 58–61, 62; 711/147, 151, 711/154, 158
See application file for complete search history.

(56) References Cited

U.S. PATENT DOCUMENTS

| | | | |
|---|---|---|---|
| 4,858,108 A | 8/1989 | Ogawa et al. | |
| 4,896,261 A | 1/1990 | Nolan | |
| 5,848,297 A | * 12/1998 | Krein et al. | 710/56 |
| 6,606,701 B1 | * 8/2003 | Tsubota | 710/52 |
| 6,782,457 B2 | * 8/2004 | Hill et al. | 711/158 |
| 6,904,472 B2 | * 6/2005 | Barrenscheen et al. | 710/15 |

FOREIGN PATENT DOCUMENTS

| | | |
|---|---|---|
| EP | 0 442 615 A2 | 8/1991 |
| EP | 1 085 721 A2 | 3/2001 |
| EP | 1 087 299 A1 | 3/2001 |
| WO | 01/20868 A1 | 3/2001 |
| WO | 01/73920 A2 | 10/2001 |

* cited by examiner

*Primary Examiner*—Kim Huynh
*Assistant Examiner*—Joshua D. Schneider
(74) *Attorney, Agent, or Firm*—Laurence A. Greenberg; Werner H. Stemer; Ralph E. Locher

(57) ABSTRACT

A device that is connected to a bus can transmit data to one or more other devices and/or can receive data from other devices, through the bus, includes storage (i.e., memories or memory areas) in which data to be transmitted or received is temporarily stored, and a control device that determines whether or not any data is to be transmitted and, if appropriate, in which storage the data that are to be transmitted next is stored and/or in which storage the received data is to be stored. Information not contained in the data transmitted through the bus is stored in each storage, and is used to allocate a priority level to the respective storage, and the control device takes this information into account to decide the storage in which the next data to be transmitted will be stored and/or the storage in which the received data is to be stored.

19 Claims, 2 Drawing Sheets

DEVICE CONNECTED TO A BUS FOR STORING INFORMATION UTILIZED TO ALLOCATE PRIORITY TO DATA STORED IN STORAGE DEVICE AND METHOD FOR OPERATING THE DEVICE

BACKGROUND OF THE INVENTION

Field of the Invention

The present invention relates to a device connected to a bus and a method for operating the device that can transmit data to one or more other devices and/or can receive data from other devices through the bus. The device contains memories or memory areas in which data to be transmitted or received is temporarily stored and a control device that determines whether or not any data is to be transmitted and, if appropriate, in which memory or memory area the data which is to be transmitted next is stored, and/or in which memory or memory area the received data is to be stored.

A device such as this is, for example, a node in a Controller Area Network (CAN). A CAN is a network known for many years and widely used for connecting devices disposed in a decentralized manner; the devices that are connected to one another through the CAN or some other network or bus system are referred to as nodes.

The basic structure of a CAN is shown in FIG. 1.

The configuration shown in FIG. 1 includes a bus BUS and nodes K1 to Kn connected to it.

Each node can transmit data to one or more other nodes and/or can receive data from other nodes through the bus BUS. The data is transmitted in units of so-called messages.

Each message is subdivided into a specific number of fields, each of which includes a specific number of bits and contains specific information or specific control data or control signals; the messages are transmitted bit-by-bit in serial form through the bus BUS.

The message fields that are of particular interest in the present case are the so-called identifier field and the so-called data field.

The identifier field includes 11 bits (Standard CAN identifier) or 29 bits (for the CAN 2.0 B protocol), and contains details about the content of the received data, to be more precise, details about the information that is transmitted or requested by the relevant message.

The data contained in the identifier field may, for example, indicate that the relevant message relates to the oil temperature, to be more precise, the data that is actually to be transmitted relates to the oil temperature, or the information that requests the node to output the message relates to the oil temperature.

The data field includes 0 to 64 bits and contains the data that has actually been transmitted, that is to say, for example, data representing the oil temperature.

With regard to the content and the length of the other fields in a message, and to other special features that are not mentioned above or in the following text, relating to a CAN, reference should be made to ISO Standard 11898.

As shown in FIG. 3, the nodes K1 to Kn that are connected to the bus BUS each contain:

- a control device (CD), which is normally referred to as a CAN controller and which is responsible for outputting data to be transmitted to the bus BUS and/or for receiving data that has been transmitted through the bus BUS;
- a data producing device (DPD1), which produces the data to be transmitted and/or a data processing device (DPD2) that processes the received data; and
- interfaces (I), which are referred to as message objects and are formed by memories or memory areas of greater or lesser size, between the CAN controller and the data producing device and/or the data processing device.

The data that are to be transmitted by the node containing the message objects through the bus BUS to one or more other nodes and that have been received from another node through the bus BUS is temporarily stored in the message objects.

For the sake of completeness, it should be mentioned that the data to be transmitted or the received data that are stored in the message objects are data from the identifier field and the data field of the message to be transmitted or of the received message, with the data in the identifier field of the message being stored in an identifier field of the message object, and the data from the data field of the message being stored in a data field in the message object.

In the example under consideration, the message objects each contain the already mentioned identifier field, an acceptance mask field, the data field, which has, likewise, already been mentioned above, and a control information field.

The identifier field contains:

- the content of the identifier field of the message to be transmitted (when data to be transmitted is stored in the relevant message object); or
- the identifier of the received message (when received data are stored in the relevant message object); or
- the identifier of the message for which the relevant message object is reserved (if the relevant message object is reserved for storing data received through the bus, but is currently unused).

The acceptance mask field contains a mask, which is referred to in the following text as the acceptance mask and which is used for choosing the message object to which data received through the bus BUS can be written. To be more precise, the acceptance mask governs which bits of the identifier that are stored in the identifier field of the message object must match the corresponding bits of the identifier in the message to make it possible to use the relevant message object for storing the data contained in the message. Data received from the node through the bus BUS can be written only to a message object whose identifier, to be more precise, its identifier part as defined by the acceptance mask, matches the corresponding identifier part of the message that contains the received data. If there is no such message object, the received data is not stored in the relevant node, that is to say, it is ignored; if there are two or more such message objects, one specific message object is chosen from them.

The data field contains the data that is actually to be transmitted (the content of the data field of a message).

Various control information is stored in the control information field, for example, information as to whether the message object is reserved for storing data to be transmitted or for storing received data, or whether the message object is or is not free (has not yet been written to or has already been read from).

The data to be transmitted from a (first) node through the bus BUS to one or more other nodes is produced by the data producing device in the first node and is written to a message object. The CAN controller reads this data from the relevant message object, joins this data to further data to form a message, and emits this message to the bus BUS. The other nodes that receive the message, to be more precise, their CAN controllers, extract from the message the data produced by the data producing device for the first node and write this data—provided that an appropriate message object is available—to a message object, from which they are finally retrieved and processed by the data processing device for the respective node.

The CAN controller searches the message objects continuously or at specific (regular or irregular) time intervals to determine whether or not and, if appropriate, what data should be transmitted next. In the process, it determines the message object in which the next data to be transmitted will be stored.

When determining the message object in which the next data to be transmitted will be stored, the prior art CAN controllers use one of the options described in the following text.

The first option is for the CAN controller to use, as the sought message object, a message object that is the first of the searched message objects in which data to be transmitted is found. Such a determination process is referred to in the following text as determination based on the sequence.

The second option is for the CAN controller to use, as the sought message object, a message object of the message objects in which data to be transmitted is stored that has the identifier having the greatest chance of winning the arbitration process that is carried out when two or more nodes emit a message to the bus at the same time. Such a determination process is referred to in the following text as determination based on the identifier.

After determining the sought message object, the CAN controller reads the data stored in the message object, to be more precise, the data stored in the identifier field and in the data field of the message object, joins this data to other data to form a message, and emits this message to the bus BUS.

A similar procedure is used when the CAN controller determines whether or not and, if appropriate, to which message object data received through the bus BUS should be written. In such a case as well, the message objects are searched in a specific sequence. In this case, the message object that is chosen as the sought message object is that which is the first of the searched message objects in whose identifier field an identifier is stored that entirely or partially matches the identifier of the received message, in which case, as has already been mentioned above, the parts of the identifier that must match are defined by the acceptance mask that is stored in the acceptance mask field.

The sequence in which the message objects are searched is defined by a message object list in the node.

Searching the message objects in the sequence described in the message object list has the advantage that it is possible to influence the choice of the message object to be used, and the procedure for their choice.

The sequence in which the message objects are searched can be varied by appropriate modification of the message object list, and can, thus, be matched to the respective conditions. However, the message objects cannot be searched during the modification of the message object list so that no messages can be transmitted, and/or received messages cannot be stored, during this time. This can represent a very high reliability or safety risk. Thus, modifications to the message object list can, frequently, be carried out only at very specific times, for example, during the initialization of the system, and, in particular, not, or only in exceptional cases, during the operation of the system.

SUMMARY OF THE INVENTION

It is accordingly an object of the invention to provide a device connected to a bus and method for operating the device that overcome the hereinafore-mentioned disadvantages of the heretofore-known devices and methods of this general type and that finds a possible way in which the choice of the message objects whose data is transmitted or in which received data is stored can be influenced at any time, in particular, during operation of the system as well, without any interference with the system.

With the foregoing and other objects in view, there is provided, in accordance with the invention, a bus-connected device transmitting data to at least one other device through a bus and/or receiving data from at least one other device through the bus, including storage devices in which data to be transmitted or received is temporarily stored, the storage devices being memories or memory areas and storing information not contained in the data transmitted through the bus, a control device connected to the storage devices and programmed to determine if any data is to be transmitted and, if data is to be transmitted, to determine which of the storage devices is storing the data to be transmitted next and/or determine which of the storage devices the received data are to be stored, and the control device being programmed to utilize the information to allocate a priority level to a respective one of the storage devices and to take the information into account when deciding which of the storage devices will be storing the data to be transmitted next and/or which of the storage devices will be storing the received data.

The device according to the invention is distinguished in that information that is not contained in the data transmitted through the bus is stored in each memory or memory area, and is used to allocate a priority level to the respective memory or memory area, and, in that, the control device takes this information into account to decide the memory or memory area in which the next data to be transmitted will be stored and/or the memory or memory areas in which the received data is to be stored.

Because the priority information in each case includes only one or a small number of bits, and because it is also possible to change the priority information of only an individual message object or of two or more specific messages objects, it is possible to influence the choice of the message object to be used at any time, in particular, during normal operation of the CAN, as well.

In accordance with another feature of the invention, the control device is programmed to search all available ones of the storage devices when determining which of the storage devices will be storing the data to be transmitted next and/or which of the storage devices will be storing the received data.

In accordance with a further feature of the invention, while searching through the available storage devices, the control device is programmed to simultaneously determine which of the storage devices will be storing the data to be transmitted next and which of the storage devices will be storing the received data.

In accordance with an added feature of the invention, the control device is programmed to search the storage devices in a predetermined sequence.

In accordance with an additional feature of the invention, the control device contains a list and the list predetermines the sequence.

In accordance with yet another feature of the invention, the storage devices store pointers and the pointers predetermine the sequence, point to one of the storage devices before a relevant one of the storage devices in the sequence, and/or point to one of the storage devices after the relevant one of the storage devices in the sequence.

In accordance with yet a further feature of the invention, the control device is programmed to take into account only the storages devices that, of searched ones of the storage devices, contain priority information representing a highest priority level found when determining which of the storage devices will be storing the data to be transmitted next and which of the storage devices will be storing the received data.

In accordance with yet an added feature of the invention, the control device is programmed to choose from the storage devices to be taken into account a storage device as the storage device to be determined that was a first to be found of the storage devices to be taken into account when searching the available storage devices.

In accordance with yet an additional feature of the invention, the control device is programmed to choose from the storage device to be taken into account as the storage device to be determined the storage device with contents having a best chance of winning an arbitration process carried out when at least two devices connected to the bus emit data to the bus at the same time.

In accordance with again another feature of the invention, the control device is programmed to choose from the storage devices to be taken into account as the storage device to be determined the storage device to be used at a relevant time based upon a stipulation in the control device.

In accordance with again a further feature of the invention, the control device is programmed to select the storage device to be determined based upon criteria from the storage devices to be taken into account, with criterion on which the selection is being based depending on the priority information of the storage device to be taken into account.

In accordance with again an added feature of the invention, when determining which of the storage devices will be storing the data to be transmitted next and which of the storage devices will be storing the received data, the control device being programmed to ignore ones of the storage devices containing specific priority information in given circumstances.

In accordance with again an additional feature of the invention, the device is a node in a controller area network.

With the objects of the invention in view, there is also provided a bus-connected node in a controller area network transmitting data to at least one other device through a bus and/or receiving data from at least one other device through the bus, including storage devices in which data to be transmitted or received is temporarily stored, the storage devices being memories or memory areas and storing information not contained in the data transmitted through the bus, a control device connected to the storage devices and programmed to determine if any data is to be transmitted and, if data is to be transmitted, to determine which of the storage devices is storing the data to be transmitted next and/or determine which of the storage devices the received data are to be stored, and the control device being programmed to utilize the information to allocate a priority level to a respective one of the storage devices and to take the information into account when deciding which of the storage devices will be storing the data to be transmitted next and/or which of the storage devices will be storing the received data.

In accordance with still another feature of the invention, the control device is programmed to ignore ones of the storage devices containing specific priority information if the node is a node in a time-triggered controller area network but is being used as a node in a normal controller area network.

In accordance with still a further feature of the invention, the control device is programmed to ignore ones of the storage devices containing specific priority information if the node is a node in a time-triggered controller area network and the time-triggered controller area network is currently in an arbitration window.

In accordance with still an added feature of the invention, the ones of the storage devices ignored when the time-triggered controller area network is currently in an arbitration window, and the ones of the storage devices ignored when the time-triggered controller area network is currently in an exclusive window, are different ones of the storage devices.

In accordance with still an additional feature of the invention, the storage devices message objects.

With the objects of the invention in view, there is also provided a method for operating a bus device connected to a bus, which bus is connected to other devices, including the steps of transmitting data from the bus device to at least one other device through the bus and/or receiving data from other devices through the bus with the bus device, temporarily storing data transmitted or received data in storage devices of the bus device, the storage devices being memories or memory areas, storing information not contained in the data transmitted through the bus in the storage devices, determining with a control device if any data is to be transmitted and, if data is to be transmitted, determining with the control device which of the storage devices is storing the data to be transmitted next, and determining which of the storage devices the received data are to be stored, and utilizing the information with the control device to allocate a priority level to a respective one of the storage devices and taking the information into account with the control device when deciding which of the storage devices will be storing the data to be transmitted next and/or which of the storage devices will be storing the received data.

Other features that are considered as characteristic for the invention are set forth in the appended claims.

Although the invention is illustrated and described herein as embodied in a device connected to a bus and method for operating the device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

The device that is described in the following text is a CAN node. However, at this point, it should be mentioned that there is no restriction to this. The special features of the device that is described in the following text may also be used in any other desired devices that are components of a bus system or of a network and in which the choice of the data to be transmitted and/or the choice of the memory or memory area in which received data is stored is made as in a CAN node or in a similar manner.

Figure 1:
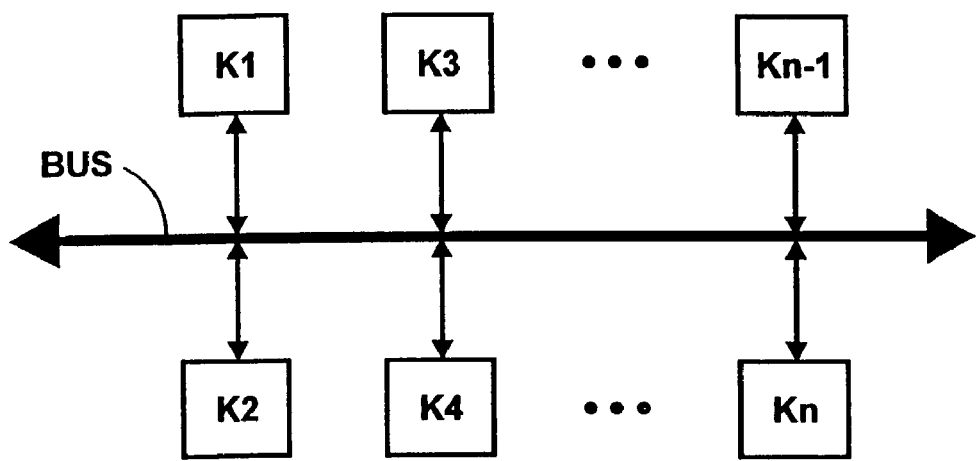
FIG. 1 is a fragmentary, block circuit diagram of a configuration of a system containing a device according to the invention.

Referring now to the figures of the drawings in detail and first, particularly to FIG. 1 thereof, there is shown the described CAN node as being one of the nodes K1 to Kn of the configuration shown in FIG. 1. However, it has a number of special features in comparison to conventional CAN nodes. In particular, a distinction is drawn between the message objects and the control device, which, in the present case, is referred to as a CAN controller and which decides what data, to be more precise, the data of which message object, are emitted to the bus BUS, and/or the message object in which data received through the bus BUS are written.

In comparison to the message objects of a conventional CAN node, the message objects of the CAN node described in the following text have one or more additional bits, using which it is possible to assign a specific priority level to the message objects, independently of one another. These additional bits, which are referred to as priority information in the following text, may be written to the message objects by any desired component of the CAN node; the CAN node can, itself, determine when what priority information is written to a message object, and/or this can be predetermined for the relevant CAN node by another CAN node. It should be mentioned at this point that the priority information can be written to a message object in a negligibly short time so that it is possible to change the priority information for individual message objects, for two or more message objects or for all the message objects without interfering with the operation of the CAN node.

Figure 2:
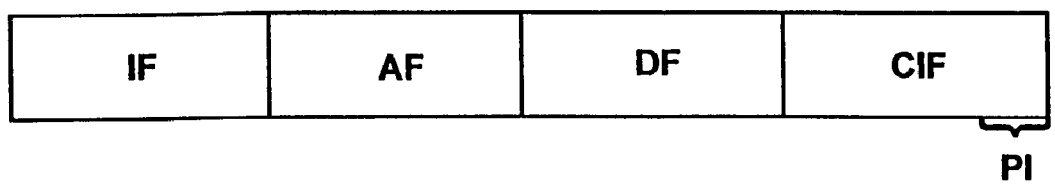
FIG. 2 is a diagrammatic illustration of a message object for the device according to the invention.
Figure 3:
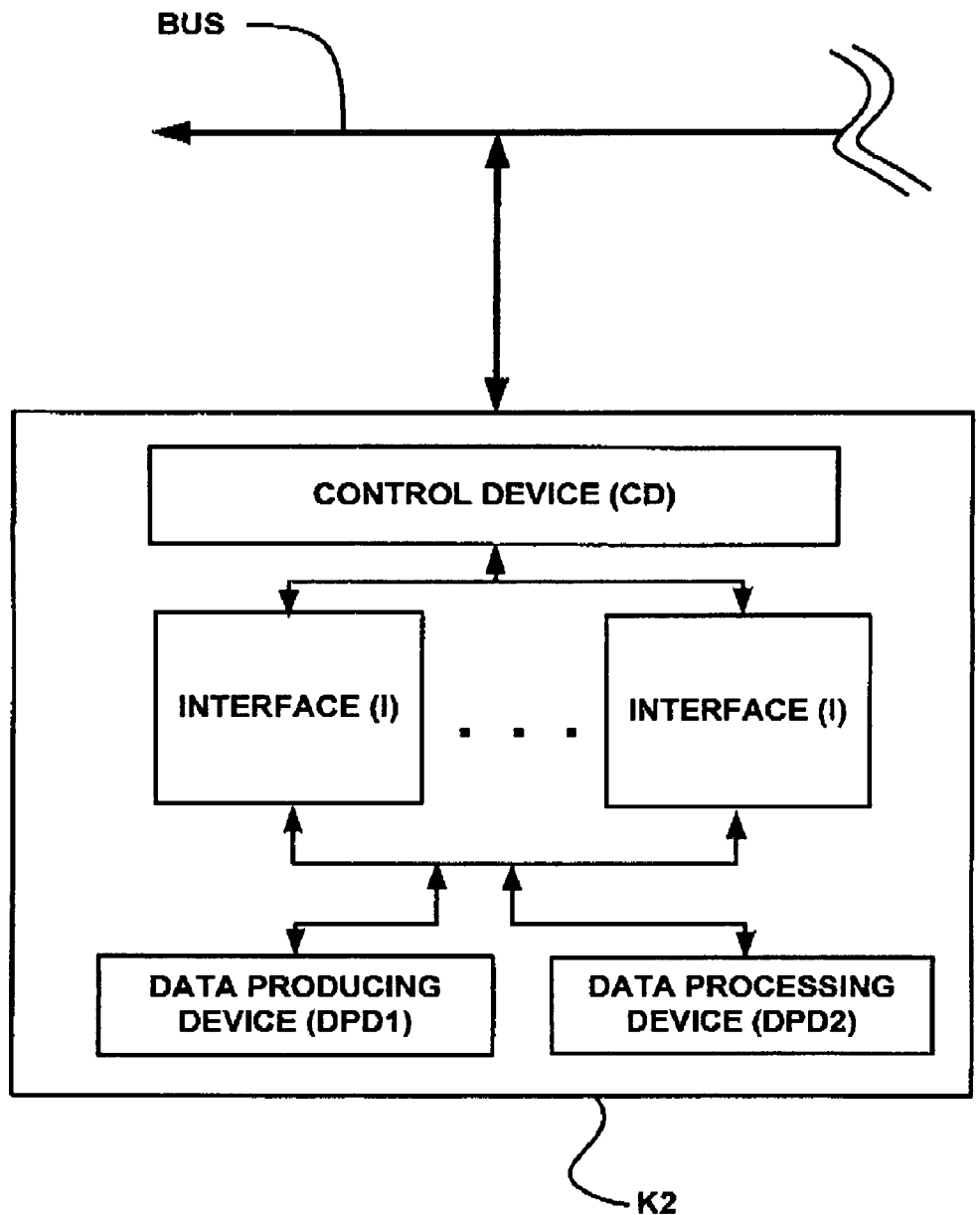
FIG. 3 is a block diagram of the contents of a node.

FIG. 2 illustrates a message object containing such priority information. The message object shown in FIG. 2 contains an identifier field IF, an acceptance mask field AF, a data field DF and a control information field CIF.

The identifier field IF, the acceptance mask field AF, and the data field DF correspond completely to the fields referred to in this way in the message object described initially.

The control information field CIF in the message object shown in FIG. 2, and the control information field in the conventional message object described initially are not the same as one another, however. The control information field CIF in the message object shown in FIG. 2 contains priority information PI, which includes one or more bits, and which the control information field in the conventional message object as described initially does not contain; apart from this, the control information field CIF in the message object shown in FIG. 2 and the control information field in the conventional message object described initially correspond to one another.

In the example under consideration, the priority information in each case includes two bits. Consequently, the message objects can be assigned one of four priority levels respectively.

In the example under consideration, priority information "11" represents the highest priority level, priority information "10" represents the second highest priority level, priority information "01" represents the third highest priority level, and priority information "00" represents the lowest priority level.

However, the priority information may also include many more or less bits, as required. Furthermore, of course, it is possible to choose any other desired association between the priority information and the priority levels.

When the CAN controller is searching for the message object that contains the data to be transmitted next, and/or that it will have to use to store received data, it searches the message objects, as before, in a sequence that is predetermined by a message object list. However, the decision on which data, to be more precise the data of which message object are to be transmitted through the bus BUS, and/or in which message object data received through the bus BUS are to be stored, additionally takes account of the priority information contained in the message objects.

The priority information is taken into account in that, of the message objects, the message object that is chosen to be used is that which is allocated the highest priority level by the priority information. To avoid misunderstandings, it should be mentioned that the highest priority level does not mean the greatest possible priority level but the highest priority level that is assigned to one or more of the existing message objects by the priority information stored therein, that is to say:

(1) when the available message objects contain only message objects in which the priority information 00 is stored, the message object to be used is chosen from all the message objects;

(2) when the available message objects include message objects in which the priority information 01 is stored, and none of the available message objects are message objects in which the priority information 10 and/or 11 is stored, the message object to be used is chosen from the message objects in which the priority information 01 is stored;

(3) when none of the available message objects are message objects in which the priority information 10 is stored and none of the available message objects are message objects in which the priority information 11 is stored, the message object to be used is chosen from the message objects in which the priority information 10 is stored; and (4) if some of the available message objects are message objects in which the priority information 11 is stored, the message object to be used is chosen from the message objects in which the priority information 11 is stored.

Although this need not be the case, the message object to be used is chosen from the message objects to be taken into account at least partially differently in the stated situations (1) to (4); each priority level is assigned a rule, the basis of which the message object to be used is to be chosen from the message objects that are assigned the relevant priority level. This rule may differ for determining the message object whose content is to be transmitted and for determining the message object in which received data is to be stored.

When choosing the message object whose contents are to be transmitted next, the procedure in the example under consideration is as follows:

in situation (1) mentioned above, that is to say, when the message object to be used is to be chosen from the message objects in which the priority information 00 is stored, a determination process based on the sequence is carried out;

in situation (2) mentioned above, that is to say, when the message object to be used is to be chosen from the message objects in which the priority information 01 is stored, a determination process based on the identifier is carried out;

in situation (3) mentioned above, that is to say, when the message object to be used is to be chosen from the message objects in which the priority information 10 is stored, a determination process based on the sequence is carried outl and in situation (4) mentioned above, that is to say, when the message object to be used is to be chosen from the message objects in which the priority information 11 is stored, a determination process is carried out as a function of the current time, as may be done, for example, for a time-triggered CAN or TTCAN in accordance with ISO 11898-4.

Accordingly, the procedure in the example under consideration is as follows.

in situation (1) mentioned above, the CAN controller transmits the data that is stored in that message object that is the first of the searched message objects that contains data to be transmitted and contains the priority information 00;

in situation (2) mentioned above, the CAN controller transmits the data that is stored in that message object which, among the message objects that contain data to be transmitted and contain the priority information 01, is that message object whose identifier has the greatest chance of winning the arbitration process that is carried out when two or more nodes emit a message to the bus at the same time;

in situation (3) mentioned above, the CAN controller transmits the data that is stored in that message object that is the first of the searched message objects that contains data to be transmitted and contains the priority information 10; and in situation (4) mentioned above, the CAN controller transmits the data that is stored in that message object that, among the message objects contain the data to be transmitted and contain the priority information 11, is that message object whose contents must be transmitted at the relevant time in accordance with a stipulation that exists in the node.

Furthermore, when determining the message object whose contents are to be transmitted, it may be found to be advantageous to ignore message objects with specific priority information when certain conditions exist. This is practiced in the example under consideration. To be more precise, in the example under consideration, message objects with the priority information 11 are ignored when the node is configured for use in a TTCAN but is used in a "normal" CAN, or when the node is used in a TTCAN and the system is currently in a time window that is referred to in the following text as an arbitration window, within which, like a normal CAN, any node can emit any desired data to the bus at any time. On the other hand, message objects with the priority information 00, 01, and 10 are ignored when the node is used in a TTCAN and the system is currently in a so-called time window that is referred to in the following text as an exclusive window, within which a specific message must be transmitted, or only a quite specific message may be transmitted.

When determining the message object to which received data should be written, the procedure in the example under consideration is for the CAN controller to store the received data in that message object that is the first message object of the searched message objects:

which is reserved for storing received data; and which has not yet been written to or else has already been read from again; and whose identifier, to be more precise, whose identifier part as predetermined by the acceptance mask, matches the corresponding identifier part of the received message; and which has been assigned the highest priority of these message objects.

In this case as well, it may be found to be advantageous for message objects with specific priority information to be ignored when specific conditions exist. This is also practiced in the example under consideration. To be more precise, in the example under consideration, message objects with the priority information 11 are ignored when the node is configured for use in a TTCAN but is used in a "normal" CAN, or when the node is used in a TTCAN and the system is currently in an arbitration window. On the other hand, message objects with the priority information 00, 01, and 10 are ignored when the node is used in a TTCAN and the system is currently in an exclusive window.

The message object list that has already been mentioned a number of times above and that predetermines the sequence in which the message objects are to be searched when the intention is to determine the message object in which the next data to be transmitted is stored and/or when the intention is to determine the message object in which received data is to be stored, contains both the message objects that are provided for temporary storage of data to be transmitted and the message objects that are provided for temporary storage of received data. This means that only a single message object list exists, which the CAN controller searches for in sequence completely both when it is searching for data to be transmitted and when it is searching for a memory space for received data. For the sake of completeness, it should be mentioned that the pointers to the respective message objects are stored in the message object list. It should also be mentioned that it is not absolutely necessary to provide a message object list. For example, instead of a message object list, it is additionally possible to provide a pointer field to the message object, in which a pointer is stored that points to the message object located after it in the message object sequence, and/or a pointer is stored that points to the message object located before it in the message object sequence; in such a situation, there may be no need to provide a message object list.

In the example under consideration, the CAN controller acts such that, when it is searching for a message object to which it can write received data, it, at the same time, also determines, while searching through the available message objects, the message object in which the next data to be transmitted is stored. However, there is no restriction to this. When searching through the available message objects, the CAN controller may, of course, also determine only the message object in which the next data to be transmitted is stored, or may determine only the message object to which received data is to be written.

Furthermore, in the example under consideration, it is possible, even while it is searching through the available message objects, for the CAN controller to determine the message object in which the next data to be transmitted is stored, and/or the message object to which received data is to be written. This means that, even while searching through the available message objects, the CAN controller chooses which of the message objects with the highest priority information is to be used; the process of determining the message object with the highest priority information and the choice of the message object to be used from these message objects take place in a single process.

An example will be used in the following text to describe how the message objects are searched. It is assumed that there are 14 message objects MO1 to MO14, which are searched in the sequence MO1, MO2, MO3, MO4, MO5, MO6, MO7, MO8, MO9, MO10, MO11, MO12, MO13, MO14. It is also assumed:

that message object MO1:
- is a message object reserved for storing data to be transmitted;
- contains data to be transmitted (and which has not yet been transmitted;, and
- contains priority information 00;

that message object MO2:
- is a message object reserved for storing data to be transmitted;
- contains data to be transmitted (and which has not yet been transmitted); and
- contains priority information 00;

that message object MO3:
- is a message object reserved for storing data to be transmitted;
- does not contain any data to be transmitted; and
- contains priority information 10;

that message object MO4:
- is a message object reserved for storing data to be transmitted;
- contains data to be transmitted (and which has not yet been transmitted); and
- contains priority information 01;

that message object MO5:
- is a message object reserved for storing data to be transmitted;
- contains data to be transmitted (and which has not yet been transmitted); and
- contains priority information 11;

that message object MO6:
- is a message object reserved for storing data to be transmitted;
- contains data to be transmitted (and which has not yet been transmitted); and
- contains priority information 01;

that message object MO7:
- is a message object reserved for storing data to be transmitted;
- contains data to be transmitted (and which has not yet been transmitted); and
- contains priority information 10;

that message object MO8:
- is a message object reserved for storing data to be transmitted;
- contains data to be transmitted (and which has not yet been transmitted); and
- contains priority information 10;

that message object MO9:
- is a message object that is reserved for storing received data;
- does not contain any data that has not yet been processed; and
- contains the priority information 00;

that message object MO10:
- is a message object that is reserved for storing received data;
- does not contain any data that has not yet been processed; and
- contains priority information 00;

that message object MO11:
- is a message object that is reserved for storing received data;
- does not contain any data that has not yet been processed; and
- contains priority information 00;

that message object MO12:
- is a message object that is reserved for storing received data;
- does not contain any data that has not yet been processed; and
- contains priority information 10;

that message object MO13:
- is a message object that is reserved for storing received data;
- does not contain any data that has not yet been processed; and
- contains priority information 11;

that message object MO14:
- is a message object that is reserved for storing received data;
- does not contain any data that has not yet been processed; and
- contains priority information 01.

Furthermore, it is assumed that the relevant node is a component of a TTCAN, which is currently in the arbitration window.

When checking message object MO1, the CAN controller registers the fact that this message object contains the priority information 00, and that this message object, in the current state, is the message object in which the next data to be transmitted is stored.

When checking the next message object MO2, the CAN controller finds that this message object cannot be the message object in which the next data to be transmitted are stored because, like the message object MO1, it contains the priority information 00 and because a determination process based on the sequence is carried out among the message objects with the priority information 00. The CAN controller, consequently, also registers the fact that the message object MO1 in the current state is the message object in which the next data to be transmitted is stored.

When checking the next message object MO3, the CAN controller finds that this message object cannot be the message object in which the next data to be transmitted is stored, because this message object does not contain any data to be transmitted. Consequently, the CAN controller also, once again, registers the fact that the message object MO1 in the current state is the message object in which the next data to be transmitted is stored.

When checking the next message object MO4, the CAN controller finds that the priority information for this message object represents a higher priority level than the priority information of the message object that until now was regarded as the message object in which the next data to be transmitted is stored. The CAN controller, consequently, registers the fact that the message object MO4 in the current state is the message object in which the next data to be transmitted is stored.

When checking the next message object MO5, the CAN controller finds that this message object cannot be the message object in which the next data to be transmitted is stored. Although this message object has been allocated a higher priority level than the message object MO4, message objects that are allocated this priority level must be ignored, however, because the system is currently in an arbitration window. As a result, the CAN controller also, once again, registers the fact that the message object MO4 in the current state is the message object in which the next data to be transmitted is stored. If the system were currently in an exclusive window, the only message objects that would be considered would be those containing the priority information 11, and, from these message objects, that message object that would be registered as the message object would be that which contains the data that had to be transmitted at the relevant time. This may be determined, for example, with the assistance of a table that is used to store when which message objects are to be used for what purpose.

When checking the next message object MO6, the CAN controller finds that this message object contains the same priority information as the message object MO4, which the CAN controller has currently registered as the message object in which the next data to be transmitted is stored. The CAN controller must, therefore, check whether the identifier stored in the identifier field of the message object MO4 or the identifier stored in the identifier field of the message object MO6 has the better chance of winning the arbitration process that is carried out when two or more nodes emit a message to the bus BUS at the same time. It is assumed that this is the identifier stored in the message object MO6. Consequently, the CAN controller registers the fact that the message object MO6 in the current state is the message object in which the next data to be transmitted is stored; otherwise, the CAN controller would also, once again, register the fact that the message object MO4 in the current state is the message object in which the next data to be transmitted is stored.

When checking the next message object MO7, the CAN controller finds that the priority information for this message object represents a higher priority level than the priority information for the message object MO6, which was previously regarded as the message object in which the next data to be transmitted is stored. As a result, the CAN controller registers the fact that the message object MO7 in the current state is the message object in which the next data to be transmitted is stored.

When checking the next message object MO8, the CAN controller finds that this message object cannot be the message object in which the next data to be transmitted is stored because, like the message object MO7, it contains the priority information 10, and because a determination process based on the sequence is carried out among the message objects with the priority information 10. In consequence, the CAN controller, once again, also registers the fact that the message object MO7 in the current state is the message object in which the next data to be transmitted is stored.

When checking the next message object MO9, this message object MO9—like all the other message objects in the example under consideration as well—is a message object for storing received data, the CAN controller checks whether or not the identifier that is stored in the message object, to be more precise that part of it which is predetermined by the acceptance mask, matches the corresponding part of the identifier of the received message. It is assumed that no match exists in this context for the message object MO9 so that message object cannot be used for storing the received data.

When checking the next message object MO10, the CAN controller may find that the identifier that is stored in the message object, to be more precise, the part of it that is predetermined by the acceptance mask, matches the corresponding part of the identifier in the received message.

The CAN controller, thus, registers the fact that the message object MO10 in the current state is the message object in which the received data is to be stored.

When checking the next message object MO11, the CAN controller finds that this message object cannot be the message object in which the received data is to be stored, because the priority information contained in it does not represent a higher priority level than the priority information in the message object M10 that is currently registered as the message object in which the received data is to be stored. The CAN controller, thus, once again, also registers the fact that the message object MO10 in the current state is the message object in which the received data is to be stored.

When checking the next message object MO12, the CAN controller may find that the identifier that is stored in the message object, to be more precise, the part of it that is predetermined by the acceptance mask, matches the corresponding part of the identifier in the received message. Because, furthermore, the priority information that is contained in the message object MO12 represents a higher priority level than the priority information in the message object M10, which is currently registered as the message object in which the received data is to be stored, the CAN controller registers the fact that the message object MO12 in the current state is the message object in which the received data is to be stored.

When checking the next message object MO13, the CAN controller finds that this message object cannot be the message object in which the received data is to be stored because, as has already been mentioned above, message objects with the priority information 11 are ignored in arbitration windows. The CAN controller, thus, once again, also registers the fact that the message object MO12 in the current state is the message object in which the received data is to be stored.

When checking the next message object MO14, the CAN controller finds that this message object cannot be the message object in which the received data is to be stored, because the priority information contained in it does not represent a higher priority level than the priority information of the message object MO12 that is currently registered as the message object in which the received data is to be stored. The CAN controller, thus, once again, also registers the fact that the message object MO12 in the current state is the message object in which the received data is to be stored.

The CAN controller has, thus, determined that the message object MO7 is the message object in which the next data to be transmitted is stored, and that the message object MO12 is the message object to which the received data is to be written.

Then, the CAN controller writes the received data to be message object MO12, and transmits the data stored in the message object MO7.

Thereafter, the CAN controller searches the available message object once again to determine the message object in which the next data to be transmitted is stored and/or to determine the message object to which data received in the meantime is to be written.

As can easily be understood when the above statements are considered, the insertion of the priority information into the message objects allows the message objects to be chosen by the CAN controller in a very flexible manner. This applies not only to message objects whose contents are to be transmitted but also to message objects in which received data is to be stored.

Because the priority information in each case includes only one or a small number of bits, and because, furthermore, it is possible to change the priority information of only an individual message object or of two or more specific message objects, it is possible to influence the choice of the message object to be used at any time, in particular, even during normal operation of the CAN.

We claim:

1. A bus-connected device at least one of transmitting data to at least one other device through a bus and receiving data from at least one other device through the bus, the bus-connected device comprising:
   storage devices in which data to be transmitted or received is temporarily stored, said storage devices being memories or memory areas;
   a control device connected to said storage devices and programmed to at least one of:
      determine if any data is to be transmitted and, if data is to be transmitted, to determine which of said storage devices is storing the data to be transmitted next; and
      determine in which of said storage devices the received data are to be stored; and
   one of said control device and another component of the bus-connected device being programmed to write into each storage device the information utilized to allocate a priority level to the data stored in that storage device, said information not being transmitted through the bus, and said control device being programmed to access each storage device of said storage devices and read said information stored therein prior to using said information to decide at least one of:
      which of said storage devices stores the data to be transmitted next; and
      in which of said storage devices the received data are to be stored.

2. The device according to claim 1, wherein, while searching through said available storage devices, said control device is programmed to simultaneously determine which of said storage devices stores the data to be transmitted next and in which of said storage devices the received data are to be stored.

3. The device according to claim 1, wherein said control device is programmed to search said storage devices in a predetermined sequence.

4. The device according to claim 3, wherein:
   said control device contains a list; and
   said list predetermines said sequence.

5. The device according to claim 3, wherein:
   said storage devices store pointers predetermining said sequence; and
   said pointers at least one of:
      point to the storage device following the storage device containing the respective pointer in said sequence; and
      point to the storage device preceding the storage device containing the respective pointer in said sequence.

6. The device according to claim 1, wherein said control device is programmed to take into account only said storages devices that, among the searched ones of said storage devices, contain priority information representing a highest priority level found when determining which of said storage devices stores the data to be transmitted next and in which of said storage devices the received data are to be stored.

7. The device according to claim 6, wherein said control device is programmed to choose from said storage devices to be taken into account, as said storage device to be determined, said storage device that was a first one of said storage devices to be taken into account that has been found when searching said available storage devices.

8. The device according to claim 6, wherein said control device is programmed to choose from said storage devices to be taken into account as a storage device to be determined, said storage device having contents with the best chance of winning an arbitration process carried out when at least two devices connected to the bus emit data to the bus at the same time.

9. The device according to claim 6, wherein said control device is programmed to choose from said storage devices to be taken into account as a storage device to be determined, said storage device stipulated which is according to stipulation in said control device to be used at the current time.

10. The device according to claim 6, wherein:
    said control device is programmed to select said storage device to be determined based upon different criteria from said storage devices to be taken into account; and
    the criterion on which said selection is based depends on said priority information of said storage device to be taken into account.

11. The device according to claim 1, wherein, when determining which of said storage devices stores the data to be transmitted next and in which of said storage devices the received data are to be stored, said control device being programmed to ignore ones of said storage devices containing specific priority information in given circumstances.

12. The device according to claim 1, wherein the device is a node in a controller area network.

13. A bus-connected node in a controller area network at least one of transmitting data to at least one other device through a bus and receiving data from at least one other device through the bus, comprising:
    storage devices in which data to be transmitted or received is temporarily stored, said storage devices being memories or memory area;
    a control device connected to said storage devices and programmed to at least one of:
       determine if any data is to be transmitted and, if data is to be transmitted, to determine which of said storage devices is storing the data to be transmitted next; and
       determine in which of said storage devices the received data are to be stored; and
    one of said control device and another component of the bus-connected device being programmed to write into the storage devices the information utilized to allocate a priority level to the data stored in a respective one of said storage devices, said information not being transmitted through the bus, and said control device being programmed to access each storage device of said storage devices and read said information stored therein prior to using said information to decide at least one of:
       which of said storage devices stores the data to be transmitted next; and
       in which of said storage devices the received data are to be stored.

14. The device according to claim 13, wherein said control device is programmed to ignore ones of said storage devices containing specific priority information if the node is a node usable in a time-triggered controller area network but is being used as a node in a normal controller area network.

15. The device according to claim 14, wherein said control device is programmed to ignore ones of said storage devices containing specific priority information if the node is a node in a time-triggered controller area network and the time-triggered controller area network is currently in an arbitration window.

16. The device according to claim 13, wherein said control device is programmed to ignore ones of said storage devices containing specific priority information if the node is a node in a time-triggered controller area network and the time-triggered controller area network is currently in an arbitration window.

17. The device according to claim 16, wherein said ones of said storage devices ignored when the time-triggered controller area network is currently in an arbitration window, and said ones of said storage devices ignored when the time-triggered controller area network is currently in an exclusive window, are different ones of said storage devices.

18. The device according to claim 13, wherein said storage devices are message objects.

19. A method for operating a bus device connected to a bus, which bus is connected to other devices, which comprises:
   at least one of transmitting data from the bus device to at least one other device through the bus and receiving data from at least one other device through the bus;
   temporarily storing data to be transmitted or received data in storage devices of the bus device, the storage devices being memories or memory areas;
   writing, with one of a control device and another component of the bus-connected device, information not contained in the data transmitted through the bus to the storage devices;
   determining with the control device:
      if any data is to be transmitted and, if data is to be transmitted, determining with the control device which of the storage devices is storing the data to be transmitted next; and
      determining in which of the storage devices the received data are to be stored;
   utilizing the information with the control device to allocate a priority level to a respective one of the storage devices and accessing each storage device of the storage devices with the control device and reading the information stored therein prior to using the information to decide at least one of:
      which of the storage devices stores the data to be transmitted next; and
      in which of the storage devices the received data are to be stored;
   after the determining step, at least one of writing the received data into the determined storage devices and transmitting the data to be transmitted next from the determined storage devices.

* * * * *